United States Patent [19]
Bonitz

[11] Patent Number: 6,000,002
[45] Date of Patent: Dec. 7, 1999

[54] PROTECTION CIRCUIT FOR PROGRAM-CONTROLLED ELECTRICAL EQUIPMENT

[75] Inventor: Rainer Bonitz, Bad Aibling, Germany

[73] Assignee: STMicroelectronics GmbH, Grasbrunn, Germany

[21] Appl. No.: 09/004,075

[22] Filed: Jan. 7, 1998

[30] Foreign Application Priority Data

Jan. 8, 1997 [DE] Germany .......................... 197 00 397

[51] Int. Cl.$^6$ ........................................ G06F 9/46
[52] U.S. Cl. .................. 710/260; 710/261; 710/262; 710/264; 710/266
[58] Field of Search ................. 710/260, 261, 710/262, 263, 264, 265, 266, 267, 268, 269

[56] References Cited

U.S. PATENT DOCUMENTS

| | | | |
|---|---|---|---|
| 4,209,840 | 6/1980 | Beradi et al. | 364/200 |
| 5,128,943 | 7/1992 | Tulpule et al. | 371/9.1 |
| 5,241,680 | 8/1993 | Cole et al. | 395/750 |
| 5,301,347 | 4/1994 | Kensky | 395/800 |
| 5,487,181 | 1/1996 | Dailey et al. | 455/89 |
| 5,630,090 | 5/1997 | Keehn et al. | 395/433 |
| 5,835,750 | 11/1998 | Pan-Ratzlaff | 395/500 |

FOREIGN PATENT DOCUMENTS 3-229332  10/1991  Japan .

*Primary Examiner*—Ayaz R. Sheikh
*Assistant Examiner*—Tim T. Vo
*Attorney, Agent, or Firm*—Theodore E. Galanthay; David V. Carlson; Seed and Berry LLP

[57] ABSTRACT

A protection circuit for the prevention of program interruptions of electrical equipment controlled on the basis of program step clocks, by too frequent occurrences of non-maskable interrupt signals. This protection circuit comprises a controllable interrupt signal passage circuit which, depending on an output signal of a control signal source, can be controlled to a state permitting the passage of the non-maskable interrupt signal or to a state blocking said signal. The control signal source comprises a clock counter with overflow resetting function, by means of which program step clock pulses can be counted starting from a predetermined initial counting value until a predetermined overflow counting value is reached. The control signal source comprises furthermore an interrupt signal counter the counting value of which can be increased by each non-maskable interrupt event and decreased each time the overflow counting value of the clock counter is reached. The control signal source additionally comprises an evaluation logic circuit for evaluating the counts of the two counters and for issuing a control signal bringing the interrupt signal passage circuit to the blocking state thereof as long as the interrupt signal counter has a predeterminable blocking enable counting value. Finally, the control signal source comprises a status control register in which evaluation determination signals determining the evaluation behavior of the evaluation logic circuit for predetermining the overflow counting value and the blocking enable counting value as well as status signals for the status indication at least with respect to the protection circuit can be stored.

15 Claims, 1 Drawing Sheet

PROTECTION CIRCUIT FOR PROGRAM-CONTROLLED ELECTRICAL EQUIPMENT

TECHNICAL FIELD

The invention relates to a program-controlled electrical equipment having a program with interrupt routines by means of which interrupt signals are issued upon occurrence of predetermined events, with said signals having the effect that a routine being run (main routine) is interrupted and another routine (subroutine) is started, and upon performing the latter, the program returns to the interrupted main routine.

BACKGROUND OF THE INVENTION

There are maskable and non-maskable interrupt signals. Non-maskable interrupt signals have the highest priority and are authorized to interrupt the execution of maskable interrupt routines to achieve an immediate start of the non-maskable interrupt routine. It is known from JP 3-229 332 A in: Patent Abstracts of Japan, Section P, No. 1296, Vol. 16, No. 9, page 90, to dispose in a signal path between a circuit component delivering a non-maskable interrupt signal and a CPU responsive thereto, a controllable interrupt signal passage circuit which, in response to an output signal of a control signal source, can be controlled to a state permitting passage of the non-maskable interrupt signal or a state blocking the non-maskable interrupt signal. To this end, there is provided an AND circuit, with one input thereof being fed with the non-maskable interrupt signal and with the other input thereof being connected to an output of a flipflop adapted to be fed with a control signal determining the switching state of the flip-flop. Depending on the switching state of the flipflop, the non-maskable interrupt signal is thus either allowed to pass to the CPU or blocked. The control signal blocking such passage is supplied to the flipflop during loading of a starting program. As long as the control signal controls for passage of the non-maskable interrupt signal, the non-maskable interrupt signal reaches the CPU.

Too frequent occurrence of non-maskable interrupt signals, for example due to interferences on the circuit board on which there is a line for non-maskable interrupt signals, can result in erroneous behavior of the program-controlled system. When mainly the non-maskable interrupt routine is active, there is probably too little calculating power left for other tasks of complex systems.

SUMMARY OF THE INVENTION

It is an object of the invention to overcome the problem of too frequent occurrence of non-maskable interrupt signals.

To this end, the invention makes available a protection circuit of the type indicated in claims appended hereto.

The protection circuit against the too frequent occurrence of non-maskable interrupt signals, according to the invention, comprises a controllable interrupt signal passage circuit which, depending on a control status established by a control signal source, either allows the passage of or blocks an incoming non-maskable interrupt signal. The control signal source comprises a clock counter with overflow resetting function, which counts program step clock pulses until a predeterminable overflow counting value is reached, an interrupt signal counter whose counting value is increased by each occurrence of a non-maskable interrupt signal and reduced each time the overflow counting value of the clock counter is reached, an evaluation logic circuit evaluating the counts of both counters and blocking the interrupt signal passage circuit as long as the interrupt signal counter has a predeterminable counting value, and a register in which signals determining the evaluation behavior of the evaluation logic circuit and status signals for status indication at least with respect to the protection circuit can be stored.

According to an embodiment of the invention, a programmable double stage counter is used. When non-maskable interrupt signals appear with too high frequency, the non-maskable interrupt signal is blocked and an error flag is set which can be evaluated by the application software.

According to an embodiment of the invention, the interrupt signal counter and the clock counter together have a number of counter stages that is equal to a data bus bit number of a system. For example, in case of a system with an 8-bit data bus, the interrupt signal counter and the clock counter together comprise 8 counter stages. In a preferred embodiment, these 8 counter stages are divided to 2 counter stages for the interrupt signal counter and 6 counter stages for the clock counter.

Respective counter readings of clock counter and interrupt signal counter are evaluated by the evaluation logic circuit. The evaluation logic circuit is programmable with the aid of the register in which evaluation determination signals can be stored determining the evaluation behavior of the evaluation logic circuit. These can be used for example for programming at which counting value the clock counter reaches its overflow counting value at which it starts on the one hand a new counting run and at which on the other hand the counting value of the interrupt signal counter reached at the moment is reduced.

The register, furthermore, is adapted to store status signals by means of which conditions can be indicated at least within the protection circuit, for example for keeping a controlling microprocessor informed of such conditions.

The register thus provides the possibility of choosing between different possible counter characteristics and of sending diagnosis information to a microcontroller or microprocessor.

The protection circuit according to the invention can be used as digital interference filter to suppress the effect of electromagnetic interference pulses for example. Another application is for anti-lock braking systems for vehicle brakes. Without a protection circuit according to the invention, a too frequent occurrence of non-maskable interrupt signals per unit of time could result in permanent locking of the braking system.

The invention will now be elucidated in more detail with reference to a non-limitative example of embodiment shown in the attached drawing figure.

DETAILED DESCRIPTION OF THE INVENTION

Figure 1:
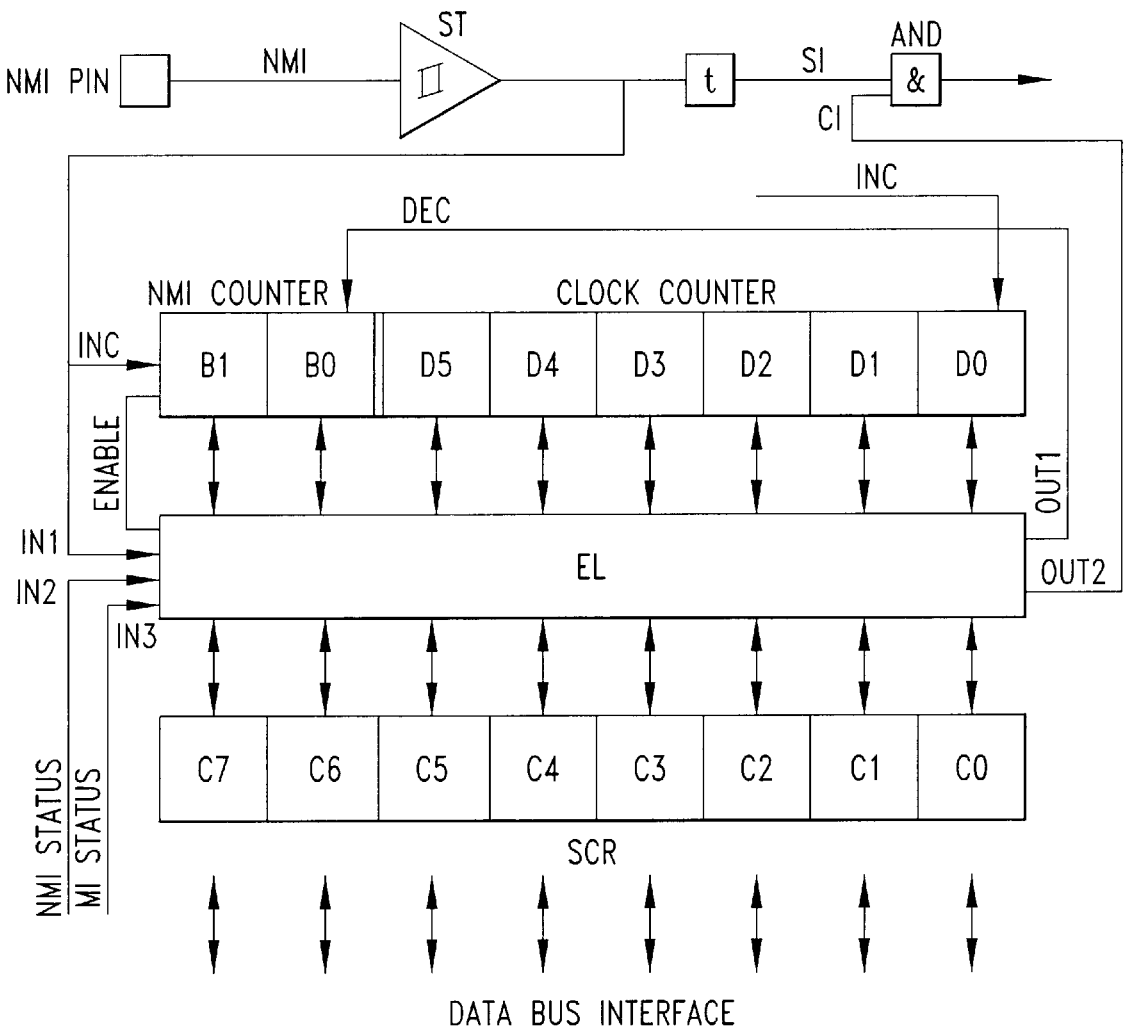
FIG. 1 shows an embodiment of the protection circuit according to the invention.

In the embodiment shown, the protection circuit is integrated monolithically and comprises a terminal pin NMI PIN which can be fed with a non-maskable interrupt signal. The latter reaches, via a Schmitt trigger SI and a delay member t, a signal input SI of an AND circuit AND serving as a controllable interrupt signal passage circuit. Via a control signal input CI, AND circuit AND can be controlled so as to either allow passage of the non-maskable interrupt signal or block the same. It can thus be determined via the control signal input CI whether or not the non-maskable interrupt signal NMI appears at the output of AND.

The blocking or passing state of AND is under the control of a control signal source comprising an NMI COUNTER serving as interrupt signal counter and having two counter stages B0, B1, as well as a CLOCK COUNTER counting program step clock pulses and having six counter stages D0 to D5. The CLOCK COUNTER receives, at the counter stage D0 thereof and via a counting value increasing input INC, program step clock pulses from a CPU (not shown) which are counted in upward direction by the CLOCK COUNTER until a predeterminable overflow counting value of the CLOCK COUNTER is reached.

The counter stages B0 and B1 of the NMI counter are provided with a downcounting input DEC and an upcounting input INC, respectively.

The embodiment shown in FIG. 1 also comprises an 8-bit data bus system, and this is why the NMI COUNTER and the CLOCK COUNTER together have 8 counter stages. An arbitrary other division of the counter stages to the two counters is possible as well.

The two counters have an evaluation logic circuit EL connected in parallel thereto which in turn is connected in parallel to a status control register SCR. The status control register SCR in the embodiment shown also comprises 8 register stages C0 to C7 in the light of the 8-bit data bus system.

Between the evaluation logic EL and the two counters on the one hand and the status control register SCR on the other hand, there is an 8-bit connection each. The 8 stages of the status control register SCR are connected to the system data bus via an 8-bit data bus interface DATA BUS INTERFACE. The evaluation logic EL has three inputs IN1, IN2, IN3 and two outputs OUT1, OUT2. IN1 is fed with the non-maskable interrupt signal NMI coming from the Schmitt trigger ST. IN2 and IN3 receive from a microprocessor (not shown) status signals NMI STATUS and MI STATUS, respectively, which provide status information regarding non-maskable interrupt signals and maskable interrupt signals, respectively. The outputs OUT1 and OUT2 of the evaluation logic circuit EL are connected to the downcounting input DEC of the NMI COUNTER and to the control signal input CI of AND circuit AND, respectively.

A line connection for an enable signal ENABLE is present between the evaluation logic circuit EL and the counter stage B1 of the NMI COUNTER.

The mode of operation of the protection circuit shown in FIG. 1 will now be elucidated in the following.

The Schmitt trigger ST serves to suppress interference signals up to a certain extent. The delay member t serves to delay a non-maskable interrupt signal NMI occurring at the output of the Schmitt trigger ST by a short period of time before it is fed into the signal input SI of AND, in order to give the protection circuit sufficient time for a status analysis and a reaction to the arrival of a non-maskable interrupt signal NMI.

The NMI COUNTER increases its count each time it receives a non-maskable interrupt signal NMI via the upcounting input INC and reduces its count each time it receives a downcounting pulse from the evaluation logic circuit EL via its downcounting input DEC. The NMI COUNTER does not have an overflow function. It therefore cannot be reset to its initial count of 0 by reaching a maximum counting value, but only by downcounting to its initial count 0.

In contrast thereto, the CLOCK COUNTER is an overflow counter which performs upcounting of the program step clock pulses from the CPU and upon reaching a selectable overflow counting value is reset to its initial count 0. As soon as the evaluation logic circuit EL detects that the CLOCK COUNTER has reached its overflow value, it issues via its first output OUT1 and the downcounting input DEC a downcounting pulse to the NMI COUNTER.

When the evaluation logic circuit EL detects that the NMI COUNTER has reached a programmable blocking enable counting value, it issues a blocking control signal via its second output OUT2 to the control signal input CI of the AND circuit AND, so that AND is controlled to the blocking state and further non-maskable interrupt signals NMI no longer reach the output of AND, and additional non-maskable interrupt events thus are not reported further any more. The blocking of AND is cancelled only after the NMI COUNTER has reached its initial count 0 again. The duration of the interrupt signal lock is given by the number of program step clock pulses which is required so that the NMI COUNTER performs downcounting to its initial count 0. Further non-maskable interrupt signals cannot cause renewed upcounting of the NMI COUNTER during this blocking period.

Via the status control register SCR, programming is possible with respect to the overflow counting value of the CLOCK COUNTER and the blocking enable counting value of the NMI COUNTER. It can thus be determined through such programming after how many non-maskable interrupt events the passage of further non-maskable interrupt signals is to be blocked and after how may program step clock pulses delivered by the CPU this blocking state is to be cancelled again.

The status control register SCR stores both parameters for presetting the evaluation of counts of the NMI COUNTER and of the CLOCK COUNTER by the evaluation logic circuit EL, and parameters for status indication. In this respect the individual register stages C0 to C7 have stored therein the functional parameters indicated in the following table 1.

TABLE 1

| STATUS CONTROL REGISTBR | |
|---|---|
| Bit No. | Function |
| C0 | ICSEL0 |
| C1 | ICSEL1 |
| C2 | NMISEL |
| C3 | LOCKSTATUS |
| C4 | MACT |
| C5 | CLEAR |
| C6 | ENABLE |
| C7 | NMI |

The functional parameters ICSEL0 and ICSEL1 in Table 1 serve to select or predetermine the overflow counting value of the CLOCK COUNTER. The following table 2 shows the association of the overflow counting values with the possible binary value combinations for ICSEL0 and ICSEL1.

TABLE 2

| ICSEL0 | ICSEL1 | Overflow |
| --- | --- | --- |
| 0 | 0 | 4 |
| 0 | 1 | 16 |
| 1 | 0 | 32 |
| 1 | 1 | 64 |

The functional parameter NMISEL serves to select or predetermine the blocking enable counting value of the NMI COUNTER. The two possible binary values of NMISEL have blocking enable counting values associated therewith in accordance with following Table 3.

TABLE 3

| NMISEL | Blocking Enable Counting Value |
| --- | --- |
| 0 | 2 |
| 1 | 3 |

The status parameters stored in register stages C3 to C7 have the following meanings:

LOCKSTATUS is set to the binary value "1" as long as a non-maskable interrupt signal cannot pass the AND circuit AND.

MACT is set to "1" when the current non-maskable interrupt event occurs during the execution of a maskable interrupt routine. MACT is reset at the end of the non-maskable interrupt routine.

CLEAR causes resetting of both counters when CLEAR is set to "1".

ENABLE sets the protective mechanism of the protection circuit in operation when ENABLE is set to "1", and switches the control signal input CI of AND permanently to the passage enable binary value "1" when ENABLE is set to "0".

NMI is set to "1" when a non-maskable interrupt event occurs during the locking state of AND, and is cancelled as soon as AND is controlled to the enable state.

The status parameter LOCKSTATUS is used so as to allow retrieval, by means of software, from the status register SCR whether the protection circuit is in the passage state or in the blocking state for the non-maskable interrupt signal NMI.

The protective function of the protection circuit can be switched off via the parameter ENABLE, so that each non-maskable interrupt signal can pass the AND logic circuit AND.

The status signals NMI STATUS and MI STATUS supplied to the evaluation logic circuit EL via the inputs IN2 and IN3 are on an activating high potential when the non-maskable interrupt routine or a maskable interrupt routine, respectively, is active. Via the DATA BUS INTERFACE, data as well as read and write signals can be exchanged with the status control register SCR. By means of the read signals, it is possible to retrieve from the status control register SCR how the evaluation control logic EL is programmed. The status control register SCR can be programmed via the write signals.

The circuit according to the invention can also be used for debouncing.

The conformity between the total number of counter stages of the two counters with the bit number of the data bus system is not cogent, but is advantageous. The division of the entire number of counter stages of the two counters to two stages for the NMI COUNTER and 6 stages for the CLOCK COUNTER is not cogent. Arbitrary other divisions of the total number of counter stages to the two counters are possible as well, in dependence on the necessities of the respective specific embodiment of the protection circuit.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A protection circuit for the prevention of program interruptions of electrical equipment controlled on the basis of program step clocks, by too frequent occurrences of non-maskable interrupt signals, comprising a controllable interrupt signal passage circuit which is adapted to be fed with a non-maskable interrupt signal coming from an interrupt signal source and which, depending on an output signal of a control signal source, is adapted to be controlled to a first state permitting passage of the non-maskable interrupt signal or a second state blocking the non-maskable interrupt signal wherein the control signal source comprises:

a clock counter with overflow resetting function, by means of which program step clock pulses can be counted starting from a predetermined initial counting value until a predetermined overflow counting value is reached;

an interrupt signal counter the counting value of which can be increased by each occurrence of a non-maskable interrupt signal and decreased each time the overflow counting value of the clock counter is reached;

an evaluation logic circuit for evaluating the counts of said two counters and for issuing a control signal bringing the interrupt signal passage circuit to the blocking state thereof as long as the interrupt signal counter has a predeterminable blocking enable counting value; and a status control register in which evaluation determination signals determining the evaluation behavior of the evaluation logic circuit for predetermining the overflow counting value and the blocking enable counting value as well as status signals for the status indication at least with respect to the protection circuit can be stored.

2. The protection circuit of claim 1, which is adapted to be coupled with an N-bit data bus and in which the clock counter and the interrupt signal counter together have N counter stages and the status control register has N register stages.

3. The protection circuit of claim 1, wherein the non-maskable interrupt signal delivered from the interrupt signal source is supplied to the control signal source directly and to the interrupt signal passage circuit via a delay circuit, the delay circuit delaying the non-maskable interrupt signal supplied thereto by a period of time which is at least as long as the period of time the control signal source takes as of receipt of the non-maskable interrupt signal to issuance of the control signal.

4. The protection circuit of claim 1, wherein the non-maskable interrupt signal can be supplied to the interrupt signal passage circuit and the control signal source via a Schmitt trigger.

5. The protection circuit of claim 1,
wherein the interrupt signal passage circuit comprises an AND circuit having a signal input and a control input, with the signal input being adapted to be fed with the non-maskable interrupt signal and the control input being adapted to be fed with the control signal of the control signal source.

6. An electronic circuit for preventing too frequent occurrences of non-maskable interrupt signals to an electronic device, comprising:

a control signal source for generating a control signal, said control signal source having an interrupt signal counter for counting the occurrence of the non-maskable interrupt signal; and a controllable interrupt signal passage circuit adapted to receive a non-maskable interrupt signal, said controllable interrupt signal passage circuit receiving said control signal from the control signal source and being adapted to a first state permitting passage of the non-maskable interrupt signal or a second step blocking the passage of the non-maskable interrupt signal when a counting value of the interrupt signal counter reaches a predetermined blocking enable counting value.

7. The electronic circuit of claim 6 wherein the control signal source further comprises:

a clock counter with overflow resetting function, said clock counter counting system clock pulses of the electronic device from a predetermined initial counting value until a predetermined overflow counting value;

an evaluation logic circuit for evaluating the counting value of said clock counter and said interrupt signal counter, said evaluation logic circuit generating the control signal to block the passage of the non-maskable interrupt signal when the interrupt signal counter has the predetermined blocking enable counting value; and a status control register for storing evaluation determination signals to determine evaluation behaviors of the evaluation logic circuit, the predetermined overflow counting value of the clock counter, the predetermined blocking enable counting value, and status signals.

8. The electronic circuit of claim 7, said electronic circuit is adapted to be coupled with an N-bit data bus wherein said clock counter and said interrupt signal counter together have N counter stages and said status control register has N register stages.

9. The electronic circuit of claim 6, further comprising a delay circuit wherein the non-maskable interrupt signal is supplied to the control signal source directly and to the interrupt signal passage circuit via the delay circuit, said delay circuit delaying the non-maskable interrupt signal supplied by a period of time which is at least as long as the period of time the control signal source takes between receiving the non-maskable interrupt signal and issuing the control signal.

10. The electronic circuit of claim 6, further comprising a Schmitt trigger wherein the non-maskable interrupt signal is supplied to the interrupt signal passage circuit and the control signal source via the Schmitt trigger.

11. The electronic circuit of claim 6 wherein the interrupt signal passage circuit comprises an AND circuit having a signal input and a control input, said signal input being adapted to receive the non-maskable interrupt signal and said control input being adapted to receive the control signal from the control signal source.

12. The control signal source of claim 7 wherein the status control register comprises an enable register stage to enable or disable the operation of said electronic circuit, a lock status register stage for reporting the blocking status of the non-maskable interrupt signal, and a clear register stage for resetting both counters.

13. The control signal source of claim 7 wherein the evaluation logic circuit provides a downcounting signal to the interrupt signal counter, said interrupt signal counter reducing the counting value by one upon receiving the downcounting signal, said downcounting signal being issued by the evaluation logic circuit each time the clock counter reaching the predetermined overflow counting value.

14. A method for preventing too frequent occurrences of non-maskable interrupt signals fed to an electronic device, said method comprising:

determining a blocking enable counting value of the electronic device;

receiving an non-maskable interrupt signal;

increasing a counting value of an interrupt signal counter by one upon receiving the non-maskable interrupt signal;

evaluating the counting value of the interrupt signal counter by an evaluation logic circuit;

issuing an control signal by the evaluation logic circuit to an interrupt signal passage circuit to determine a passage or a blocking state for the non-maskable interrupt signal, said control signal blocking the passage of the non-maskable interrupt signal once the counting value of the interrupt signal counter reaches the blocking enable counting value;

receiving the non-maskable interrupt signal to the interrupt signal passage circuit via a delay circuit; and passing or blocking the non-maskable interrupt signal through the interrupt signal passage circuit.

15. The method of claim 14, further comprising:

determining an overflow counting value of a clock counter, said clock counter increasing its counting value by one at each clock pulse of the electronic device;

issuing a downcounting signal by the evaluation logic circuit to the interrupt signal counter when the clock counter reaches the overflow counting value; and decreasing the counting value of the interrupt signal counter by one upon receiving the downcounting signal.

* * * * *

UNITED STATES PATENT AND TRADEMARK OFFICE
CERTIFICATE OF CORRECTION

PATENT NO.   : 6,000,002
DATED        : December 7, 1999
INVENTOR(S)  : Rainer Bonitz It is certified that error appears in the above-identified patent and that said Letters Patent is hereby corrected as shown below:

<u>Column 7,</u>
Line 16, "a non-maskable interrupt signal" should read -- the non-maskable interrupt signal --.
Line 19, "adapted to a first state permitting passage" should read -- adapted in a first state to permit passage --.
Line 20, "or a second step blocking the passage" should read -- or in a second state to block the passage --.

Signed and Sealed this

First Day of October, 2002

*Attest:*

JAMES E. ROGAN
*Attesting Officer*           Director of the United States Patent and Trademark Office